US005501529A

United States Patent [19]

Cadle et al.

[11] Patent Number: 5,501,529

[45] Date of Patent: Mar. 26, 1996

[54] BEARING SUPPORT INSERT

[75] Inventors: Terry M. Cadle, Wauwatosa; Carl J. Landgraf, Waukesha; Georgia M. Mayer, Hartford, all of Wis.

[73] Assignee: Zenith Sintered Products, Inc., Germantown, Wis.

[21] Appl. No.: 245,175

[22] Filed: May 17, 1994

[51] Int. Cl.[6] ................................ F16C 35/00; F02F 7/00

[52] U.S. Cl. ..................... 384/432; 123/195 R; 384/279; 384/434

[58] Field of Search .................................... 384/279, 288, 384/294, 429, 430, 432, 433, 434; 123/195 R

[56] References Cited

U.S. PATENT DOCUMENTS

| | | | |
|---|---|---|---|
| 2,997,347 | 8/1961 | Bauer | 384/432 |
| 4,412,514 | 11/1983 | Hayakawa et al. | 123/195 R |
| 4,465,041 | 8/1984 | Mayashi | 123/195 R |
| 4,643,145 | 2/1987 | Bolton et al. | 123/195 R |
| 4,693,216 | 9/1987 | Ampferer et al. | 384/433 X |

FOREIGN PATENT DOCUMENTS

| | | | |
|---|---|---|---|
| 0363159 | 4/1990 | European Pat. Off. . | |
| 0623761 | 11/1994 | European Pat. Off. . | |
| 2567973 | 1/1986 | France . | |
| 1268842 | 10/1989 | Japan . | |
| 2237337 | 5/1991 | United Kingdom | 384/429 |

OTHER PUBLICATIONS

Exhibit A—a copy of International Search Report for International Application No. PCT/US95/05517.

*Primary Examiner*—Thomas R. Hannon
*Attorney, Agent, or Firm*—Quarles & Brady

[57] ABSTRACT

A bearing insert for being cast into an aluminum alloy engine block is made by a ferrous powder metal sintering process to make a skeleton structure which is permeable to the molten aluminum alloy in the block casting process. The insert is made of a material having a similar composition as the bearing cap so as to equalize machining and thermal expansion properties of the cap and block so as to provide improved roundness of the bearing in the machining operations for forming the bearing support and in operation of the engine.

10 Claims, 1 Drawing Sheet

BEARING SUPPORT INSERT

FIELD OF THE INVENTION

This invention relates to main bearing supports for internal combustion engines and in particular to such supports made from powder metal for being cast into an aluminum alloy engine block as a casting insert.

BACKGROUND OF THE INVENTION

In modern internal combustion engines, particularly automotive engines, light weight and quiet operation are very desirable qualities. The use of an aluminum alloy to replace cast iron as the traditional material of the engine cylinder block meets the first requirement, but can adversely affect the quietness of the engine. Since the crankshaft converts the reciprocating motion of the engine's pistons to the rotary motion needed for locomotion, it is subject to high frequency cyclic loading that may produce noise which can be heard by the vehicle occupants. A major factor in noise generation is the roundness of the bearing surface that retains the rotating crankshaft. This roundness is largely controlled by the machining operations of the bearing supports which include line boring and microfinishing.

Since the crankshaft bearing is retained in two half circular bearing supports, the ideal situation for machining is a common material in the two bearing support half rounds. In the case of a cast iron cylinder block and a cast iron or sintered powder metal steel bearing cap, this is achieved. When an aluminum alloy cylinder block is used with a cast iron or sintered powder metal steel main bearing cap however, the difference in machining characteristics of the two dissimilar metals causes a nonround bore leading to increased noise. The difference in thermal coefficient of expansion of cast iron or steel powder metal and aluminum alloys (aluminum is almost twice as great) causes further out of roundness as engine temperatures fluctuate, especially when under high engine loads.

SUMMARY OF THE INVENTION

The present invention addresses these concerns by providing a bearing support insert having a skeleton structure for casting into the engine block and a method of making the insert. The molten aluminum alloy of the engine block flows into the skeleton structure of the insert to reinforce and secure the insert in the block when the aluminum alloy solidifies. Since the ferrous metal skeleton is more rigid than the reinforcing aluminum alloy, it is dominant with respect to thermal expansion and so substantially matches the ferrous main bearing cap during temperature changes. Also since the skeleton is of similar hardness and modulus of elasticity as the ferrous main bearing cap, its machining characteristics are also similar to the ferrous main bearing cap. The overall result of the invention is a quieter and lighter engine.

DETAILED DESCRIPTION OF THE PREFERRED EMBODIMENTS

Figure 1:
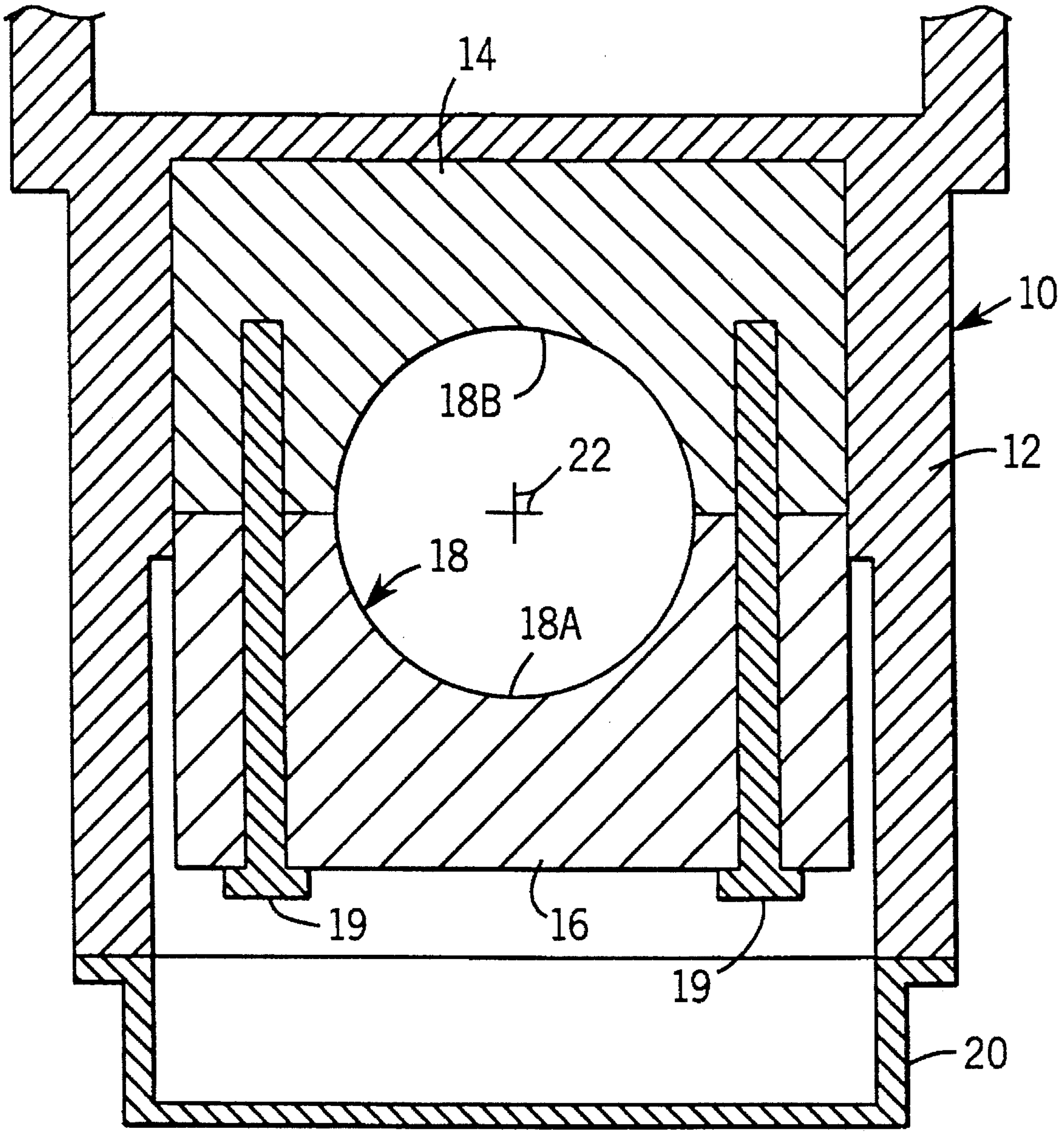
FIG. 1 is a schematic fragmentary view of a bearing support arrangement in an aluminum alloy engine block.

Referring to FIG. 1, an engine block 10 includes a main body 12 and a bearing support insert 14. The block 10 does not include a bearing cap 16 which is bolted by bolts 19 or otherwise secured to the block 10 so as to define a circular bore 18. Half-surface 18A of bore 18 is defined by cap 16 and half-surface 18B of bore 18 is defined by block 10. An oil pan 20 closes the lower end of the block 10 as is well known. Crosshairs 22 indicate the center of the bore 18, the crankshaft which would normally be journalled within the bore 18 and the bearing material which would normally be used to line the bore 18 not being shown.

In the present invention the body 12 is intended to be an aluminum alloy which is cast in the process of making the block 10. The insert 14 is a powdered ferrous metal which is made by a powder metal sintering process and which prior to being cast into the block 10 has a skeleton structure having a relatively high interconnected porosity randomly and homogeneously distributed therethrough. The insert 14 is therefore permeable to the flow of the molten aluminum alloy material of the body 12 therethrough during the casting process so as to retain the insert 14 in the block 10, strengthen the insert 14 and improve the machinability and thermal expansion properties of the bore 18.

The insert 14 is made by a powder metal sintering process. The ferrous powder material is preferably an atomized iron powder which produces maximum permeability for a given skeleton density. Alternative iron powders made by iron ore reduction (known as sponge iron) and by metal scrap comminution were found to be less permeable. It was also found that a coarse powder with minimal fines (dust) produced optimum permeability. The use of screening to eliminate fine powder particles (below 100 mesh) was found to be optimum for permeability and economics.

It is desirable in the process of making the insert skeleton 14 to limit the particle size distribution range of the powder metal from which the insert 14 is made to a relatively narrow range so as to increase or maximize the permeability of the finished insert 14. To accomplish this, a ferrous powder material, for example Metal Powder Industry Federation (MPIF) standard FCO2O5 is screened to the appropriate size range. For a coarse material a size range of −30 mesh to +100 mesh (ASTM standard mesh size) is preferred. For a medium size range, it may be possible to use a size range of −100 mesh to +325 mesh and for a fine material a size of −325 mesh may be used.

The screened material is then blended with 1–6% by weight of a non-metallic powder, for example, an organic stearate powder, which is a pore former and ejection lubricant that burns off in the sintering process. This blended material is then compacted into the desired shape of the insert (which may be any shape) at a relatively low pressure, for example 5–15 tons per square inch and preferably approximately 7 tons per square inch. Another option would involve a higher percentage of non-metallic powder compacted at a higher pressure. The compacted insert is then ejected from the mold. At this stage of the process, the insert is normally referred to as "green".

The green insert is then sintered by heating it in a protective atmosphere, as is well known in the art. Nominally, this may be done at a temperature of 2050° Fahrenheit for 15 minutes. The sintered insert is then allowed to cool to room temperature.

The finished insert skeleton 14 should have an open interconnected porosity randomly and homogeneously distributed throughout it of between 15–60%, as measured by ASTM (American Society for Testing and Materials) Standard No. B328. Preferably, this range should be 30–50%. Whereas full density of the sintered material of the insert may be typically 7.87 grams per cubic centimeter, a typical density of an insert skeleton of the invention may be approximately 5 grams per cubic centimeter. However, any percentage of open interconnected porosity sufficient for the molten aluminum alloy of the engine block to permeate the insert during the casting process is within the scope of the present invention. In addition, the invention may be incorporated into any suitable casting process, including sand mold, lost foam, die casting or other processes, and may be applied to gravity feed or low pressure casting processes, or any other casting process sufficient to permeate the material of the body 12 into the voids of the insert 14.

In the casting process the insert skeleton 14 is placed in the mold for the block, in the same manner that other types of inserts are known to be placed in casting molds, and the molten material of the body 12 is introduced to the mold. Since the insert skeleton 14 is permeable to the molten material of the body 12, the molten material flows into the skeleton to fill many if not most or all of the interconnected voids of the skeleton. When the molten material cools, the insert is substantially more solid, being made of a metal matrix composite (MMC) of the ferrous material of the insert skeleton and of the aluminum alloy material of the body. Hence, prior to the casting process, the insert 14 is referred to as the insert "skeleton" 14 and after the casting process, when the insert is incorporated into the block 10, it is referred to as the insert "metal matrix composite" 14.

The insert 14 being made permeable to the molten material of the body 12 strengthens the insert 14 by the molten material of the body 12 filling the voids of the insert 14 and also creates mechanical interconnections between the insert 14 and the body 12 which retain the insert 14 in the casting 10. In addition, the insert 14 imparts desirable machinability and thermal expansion properties to the block 10 as further described below.

Preferably, the material from which the insert 14 is made has a composition which is the same as or similar to the composition of the material of the cap 16. Therefore, the cap 16 is also preferably made from powder metal in a sintering process, the powder having a similar composition to the powder used to make the insert 14, both powders in the preferred embodiment being predominantly ferrous. However, the material of the cap 16 would typically have a broader particle size distribution range so that it is significantly more solid than the insert 14, since the cap 16 is not permeated by the material of the body 12 and must be self supporting in its finished state and under conditions of operation of the engine. By making the insert 14 and the cap 16 of similar ferrous materials, the machining characteristics of the surfaces 18A and 18B are substantially equalized so as to improve the roundness of circular bore 18.

In addition, by making the insert skeleton 14 and the cap 16 both of predominantly ferrous materials, the coefficients of thermal expansion applicable to the surfaces 18A and 18B will be equalized. This is because the ferrous material of the insert 14 is stronger than the aluminum alloy material of the body 12 so that in the ferrous/aluminum alloy material matrix of the insert 14 in the block 10, the ferrous material will overpower the aluminum alloy and largely control the coefficient of thermal expansion. Thus, the roundness of the bore 18 will be better maintained as the operating temperature of the engine fluctuates.

Preferred embodiments of the invention have been described above in considerable detail. Many modifications and variations to the preferred embodiments will be apparent to those skilled in the art. Thus, the invention should not be limited to the particular embodiments described, but should be defined by the claims which follow.

We claim:

1. A bearing support of an internal combustion engine block, said engine block comprising an aluminum alloy engine block body and a bearing insert, said insert being made of a metal composite matrix including a skeleton made from a ferrous powder metal material and the material of said body permeating interconnected voids of said skeleton.

2. A bearing support as in claim 1, wherein absent the material of said body within said skeleton, said skeleton has an open interconnected porosity in the range of 15–60%.

3. A bearing support as claimed in claim 2, wherein said open interconnected porosity of said skeleton absent the material of said body within said skeleton is in the range of 30–50%.

4. A bearing support as in claim 1, wherein the material of said skeleton has a composition similar to the composition of the material of a mating main bearing cap, said insert and said cap together defining a circular bore.

5. A bearing insert for being incorporated into an aluminum alloy engine block during a casting process of making said engine block, said insert being made from a ferrous material skeleton which is permeable to the flow of molten material of said block during said casting process, wherein said insert is made from powder metal by a sintering process.

6. A bearing insert as claimed in claim 5, wherein said powder metal has a particle size distribution in the range of −30 to +100 ASTM standard mesh size.

7. A bearing insert .as claimed in claim 5, wherein said powder metal has a particle size distribution in the range of −100 to +325 ASTM standard mesh size.

8. A bearing insert as claimed in claim 5, wherein said powder metal has a particle size of −325 ASTM standard mesh size.

9. A bearing insert for being incorporated into an aluminum alloy engine block during a casting process of making said engine block, said insert being made from a ferrous material skeleton which is permeable to the flow of molten material of said block during said casting process, wherein said insert has an open interconnected porosity percentage of between 15–60%.

10. A bearing insert as claimed in claim 9, wherein said open interconnected porosity percentage is in the range of 30–50%.

* * * * *